US012789920B1

(12) United States Patent
Lowry

(10) Patent No.: US 12,789,920 B1
(45) Date of Patent: Nov. 10, 2026

(54) SECURITY PLATE APPARATUS AND METHOD

(71) Applicant: GateGuard LLC, San Antonio, TX (US)

(72) Inventor: William Baugh Lowry, San Antonio, TX (US)

(73) Assignee: GateGuard LLC, San Antonio, TX (US)

( * ) Notice: Subject to any disclaimer, the term of this patent is extended or adjusted under 35 U.S.C. 154(b) by 321 days.

(21) Appl. No.: 18/667,015

(22) Filed: May 17, 2024

Related U.S. Application Data

(60) Provisional application No. 63/504,393, filed on May 25, 2023.

(51) Int. Cl.

| | |
|---|---|
| ***B60R 3/02*** | (2006.01) |
| ***B62D 33/027*** | (2006.01) |
| ***B62D 33/037*** | (2006.01) |

(52) U.S. Cl.
CPC ....... *B62D 33/0273* (2013.01); *B62D 33/037* (2013.01); *B60R 3/02* (2013.01); *B60Y 2304/076* (2013.01)

(58) Field of Classification Search
CPC ... B60R 3/02; B60Y 2304/076; B62D 33/023; B62D 33/027; B62D 33/0273;
(Continued)

(56) References Cited

U.S. PATENT DOCUMENTS

D292,369 S 10/1987 Greco
D310,520 S * 9/1990 Bedard .......................... D8/373
(Continued)

FOREIGN PATENT DOCUMENTS

CA 1244858 A * 11/1988 ............. B62D 33/08
CA 2859432 C * 2/2016 ......... B62D 33/0273
(Continued)

OTHER PUBLICATIONS

Gateguard, posted Dec. 9, 2023 [online], [retrieved Aug. 29, 2024]. Retrieved from internet, https://www.facebook.com/reel/1882601268822187 (Year: 2023).
(Continued)

*Primary Examiner* — Daniel M. Keck

(74) *Attorney, Agent, or Firm* — Lieberman & Brandsdorfer, LLC

(57) ABSTRACT

An apparatus and method for using the apparatus designed to mitigate vehicle theft. The apparatus includes first, second, and third sections, and two transition sections, with one transition section position between the first and second section, and another transition section position between the second and third sections. Each of the first, second, and third sections are individually relatively planar, and each of the transition sections is configured with an obtuse angle. In addition, an aperture extends through the first and second sections, both transition sections, and through a portion of the third section. The primary aperture, together with the secondary apertures and the transition sections, positions the apparatus and enables the apparatus to be received and housed within the tailgate door relative to a corresponding actuator. Once positioned within the tailgate door, the actuator maintains its functionality, while the apparatus mitigates or otherwise prevents unwarranted access the tailgate.

18 Claims, 7 Drawing Sheets

(58) Field of Classification Search
CPC .. B62D 33/0276; B62D 33/03; B62D 33/033; B62D 33/037; B62D 33/04; B62D 33/042; B62D 33/044; B62D 33/046
USPC .......................................................... 180/289
See application file for complete search history.

(56) References Cited

U.S. PATENT DOCUMENTS

| | | | | | |
|---|---|---|---|---|---|
| 5,116,096 | A * | 5/1992 | Taylor | B62D 33/033 280/415.1 |
| D337,513 | S | 7/1993 | Soloway et al. | |
| D349,231 | S | 8/1994 | Cislo | |
| D360,544 | S * | 7/1995 | Gauthier | D6/672 |
| D367,220 | S * | 2/1996 | Bush | D8/373 |
| 5,636,536 | A * | 6/1997 | Kinnucan | E05B 83/12 70/279.1 |
| D409,077 | S * | 5/1999 | Brooks | D8/354 |
| D417,833 | S | 12/1999 | Heithe | |
| 5,997,067 | A * | 12/1999 | Shambeau | B62D 33/037 296/57.1 |
| D494,844 | S * | 8/2004 | Klein | D8/372 |
| D520,322 | S * | 5/2006 | Orlando | D8/354 |
| D525,859 | S | 8/2006 | Eichert et al. | |
| 7,644,973 | B2 | 1/2010 | Carloni et al. | |
| D648,031 | S | 11/2011 | Roggenkamp | |
| D678,035 | S | 3/2013 | Stover, Jr. | |
| 9,809,142 | B1 * | 11/2017 | White | B62D 33/0273 |
| D870,524 | S | 12/2019 | Burch, V et al. | |
| 11,242,700 | B2 * | 2/2022 | Gorey | E05B 83/00 |
| D999,623 | S | 9/2023 | Flusche et al. | |
| D1,018,272 | S | 3/2024 | Sidapara | |
| D1,020,429 | S | 4/2024 | Ye | |
| 2004/0108742 | A1 * | 6/2004 | Pringnitz | E05B 63/06 296/50 |
| 2011/0215598 | A1 * | 9/2011 | Scherr | E05C 3/04 292/196 |
| 2012/0313393 | A1 * | 12/2012 | Tardif | B62D 33/0273 403/321 |
| 2020/0095816 | A1 | 3/2020 | Townson et al. | |
| 2021/0300482 | A1 * | 9/2021 | Mooney | B62D 33/037 |
| 2021/0347416 | A1 | 11/2021 | Schalyo et al. | |
| 2021/0348433 | A1 | 11/2021 | Schalyo et al. | |
| 2022/0258810 | A1 * | 8/2022 | Savard | B62D 33/0273 |
| 2024/0109604 | A1 * | 4/2024 | Pard | B62D 33/027 |
| 2024/0109605 | A1 * | 4/2024 | Pard | B62D 33/0273 |
| 2024/0109607 | A1 * | 4/2024 | Pard | B62D 33/0273 |

FOREIGN PATENT DOCUMENTS

| | | | | | |
|---|---|---|---|---|---|
| CN | 118665612 | A * | 9/2024 | B62D 33/08 |
| DE | 102024122327 | A1 * | 2/2025 | B62D 33/023 |
| KR | 20060109229 | A * | 10/2006 | B65F 3/08 |

OTHER PUBLICATIONS

Office Action, U.S. Appl. No. 29/942,799, Sep. 6, 2024.

* cited by examiner

300

SECURITY PLATE APPARATUS AND METHOD

CROSS REFERENCE TO RELATED APPLICATION(S)

This application claims the benefit of priority to U.S. Provisional Application No. 63/504,393 filed in the U.S. Patent and Trademark Office on May 25, 2023, and titled "Tailgate Security Apparatus and Method", the complete disclosure of which is incorporated herein by reference.

BACKGROUND

A land vehicle such as, but not limited to, a truck or a trailer, includes a bed and a cab positioned relative to a vehicle chassis. The cab is also known as the driver compartment of the vehicle. The bed is positioned on a back end of the vehicle chassis behind the cab, with the bed configured to receive and transport cargo. A tailgate functions as a door at a back of a truck or car, with the tailgate hinged at a bottom surface to enable the tailgate to pivot or rotate in a vertical direction relative to the bed. In an embodiment, the tailgate may be configured to rotate or swing in a different direction relative to the bed to facilitate access to the bed. When in a closed position, also referred to herein as an engaged position, the tailgate prevents cargo stored in a vehicle bed from falling out. Similarly, when in an open position, also referred to here as a disengaged position, the tailgate facilitates access to the bed and an associated cargo area.

SUMMARY

The embodiments include an apparatus and method for enhancing security of a vehicle. This Summary is provided to introduce a selection of representative concepts in a simplified form that is further described below in the Detailed Description. This Summary is not intended to identify key features or essential features of the claimed subject matter, nor is it intended to be used in any way that would limit the scope of the claimed subject matter.

In one aspect, an apparatus is provided and configured to be positioned relative to a vehicle. The apparatus is comprised of multiple sections, including first, second, and third sections, and first and second transition sections. In an embodiment, the multiple sections and transition sections are seamlessly or near seamlessly integrated to form a single cohesive unit. The first section includes a first aperture configured to be received by a secondary element. The first aperture is configured to extend from a first section proximal end to a distally positioned first section distal end. The first transition section is adjacently positioned to the first section, and is configured to transition from the first section to a second section. The first aperture extends through the second section from a second section proximal end to a distally positioned second section distal end. The second transition section is adjacently positioned to the second section and is configured to transition from the second section to a third section. The third section is configured to extend from a third section proximal end to a distally positioned third section distal end. The first aperture is configured to extend from the second transition section into the third section.

In another aspect, a method is provided to mitigate vehicle and vehicle accessory theft. The method utilizes a multi-section apparatus, with the apparatus including a first section, a first transition section adjacently positioned relative to the first section, a second section adjacently positioned relative to the first transition section, a second transition section adjacently positioned relative to the second section, and a third section adjacently positioned relative to the second transition section. The apparatus is further configured with a primary aperture extending through the first section, the first transition section, the second section, the second transition section, and into the third section. The primary aperture is configured to be received by a secondary element. The method further comprises positioning the apparatus to relative to the secondary element, including releasably engaging the secondary element. The apparatus is further configured with first and second secondary apertures extending into the first section. The secondary apertures are configured to be received by secondary elements. The method further comprises positioning the apparatus relative to the secondary elements, including releasably engaging the secondary elements.

These and other features and advantages will become apparent from the following detailed description of the present exemplary embodiment(s), taken in conjunction with the accompanying drawings.

BRIEF DESCRIPTION OF THE SEVERAL VIEWS OF THE DRAWINGS

The drawings referenced herein form a part of the specification and are incorporated herein by reference. Features shown in the drawings are meant as illustrative of only some embodiments, and not of all embodiments, unless otherwise explicitly indicated.

DETAILED DESCRIPTION

Figure 1:
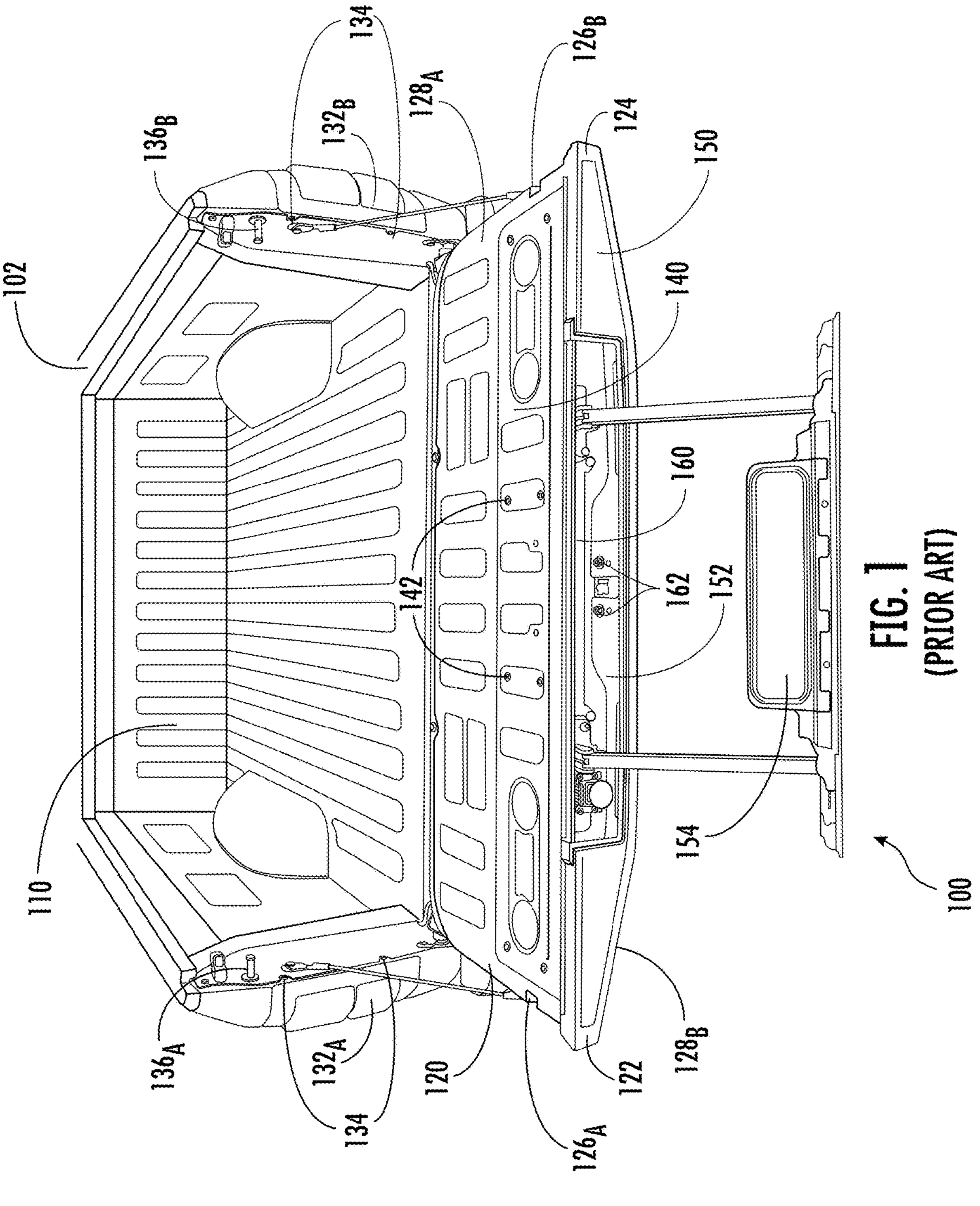
FIG. 1 (PRIOR ART)
FIG. 1 depicts a prior art illustration of a land vehicle tailgate in an open position.

It will be readily understood that the components of the present embodiments, as generally described and illustrated in the Figures herein, may be arranged and designed in a wide variety of different configurations. Thus, the following detailed description of the exemplary embodiments of the apparatus, system, and method, as presented in the Figures, is not intended to limit the scope of the embodiments, as claimed, but is merely representative of selected embodiments.

Reference throughout this specification to "a select embodiment," "one embodiment," "an exemplary embodiment," or "an embodiment" means that a particular feature, structure, or characteristic described in connection with the embodiment is included in at least one embodiment. Thus, appearances of the phrases “a select embodiment,” “in one embodiment,” “in an exemplary embodiment,” or “in an embodiment” in various places throughout this specification are not necessarily referring to the same embodiment. The embodiments described herein may be combined with one another and modified to include features of one another. Furthermore, the described features, structures, or characteristics of the various embodiments may be combined and modified in any suitable manner.

The illustrated embodiments will be best understood by reference to the drawings, wherein like parts are designated by like numerals throughout. The following description is intended only by way of example, and simply illustrates certain selected embodiments of devices, systems, products, and processes that are consistent with the embodiments as claimed herein.

It is understood in the art that a vehicle is a machine designed to transport people, cargo, or both. Vehicles come in different forms, including but not limited to, land vehicles, water vehicles, air vehicles, space vehicles, etc. The land vehicle also referred to herein as a land-based vehicle or a ground vehicle, is a type of vehicle configured to travel on land, as opposed to an aircraft configured to travel in the air, a boat configured to travel in water, and a spacecraft configured to travel through space. Regardless of the medium in which the vehicle is configured to travel, theft of vehicles and vehicle parts is problematic. A recent trend associated with vehicle theft is directed at a vehicle component or accessory. This recent theft trend is occurring because a vehicle component or accessory is many times far easier to steal and poses less risk of being caught, in comparison to stealing the entire vehicle. In addition, a vehicle component or accessary may have a value approaching that of the value commensurate with selling the entire vehicle.

The embodiments shown and described herein are directed to a land vehicle in the form of a truck, although the embodiments and corresponding device and method of use should not be considered limited to the truck. It is understood that when the tailgate is in the disengaged position, a primary opening is formed between the tailgate and the vehicle bed and providing access to cargo stored in the bed, if any. In addition, when the tailgate is in the disengaged position, one or more secondary openings positioned relative to the bed and the vehicle chassis may become exposed or otherwise opened and exposed. Many automotive manufacturers, i.e., original equipment manufacturers (OEMs) use a system of one or more mechanical or electrical actuated locks and spring-loaded latches to close and secure the tailgate, and conversely to open the tailgate. The latch consists of a system employed by OEMs that allows rapid, unimpeded access to the bed, also referred to herein as a cargo space, via mechanical and/or electric actuation, and utilizes the lock(s), e.g. mechanical and/or electrical, that allow or enable the tailgate to be closed and secured. However, there are weaknesses and security vulnerabilities associated with the design of the tailgate and associated locks. Namely, one or more existing devices allow the tailgate to be opened without using the tailgate handle, electric opening button, and the physical or electric key to unlock the tailgate. This vulnerability is often exploited by unauthorized entrants, e.g., thieves, to steal items from the vehicle bed, including but not limited to the tailgate, rear backup camera, and tail-light(s). Accordingly, as shown and described herein an apparatus and associated method are provided to address these vulnerabilities, and mitigate or eliminate unwarranted or uninvited access to the vehicle bed.

Exemplary embodiments are now described with respect to the apparatus, which is generally designated by referenced numeral (100) in FIGS. 1-7.

Referring to FIG. 1, a prior art illustration (100) of a land vehicle with a tailgate in an open position is provided. In an exemplary embodiment, the open position of the tailgate is when the tailgate is lowered or rotated in a manner that exposes and enables access to the vehicle bed. The environment shown herein is a cargo area (110) of a land vehicle (102), with a corresponding tailgate (120) shown in a lowered position thereby exposing the cargo area (110) and facilitating access thereto. The tailgate (120) includes a proximal end (122) and an oppositely positioned distal end (124). A tail-light, or in an embodiment a tail-light assembly, is positioned adjacent to each end of the tailgate (120). Namely, a first tail-light ($\mathbf{132}_A$) is positioned adjacent to the proximal end (122) and a second tail-light ($\mathbf{132}_B$) is positioned adjacent to the distal end (124). With the tailgate (120) shown in the lowered position, the first and second tail-light, ($\mathbf{132}_A$) and ($\mathbf{132}_B$), respectively, are non-obstructed. Conversely, when the tailgate (120) is in a raised position (not shown), the first and second tail-light ($\mathbf{132}_A$) and ($\mathbf{132}_B$), respectively, as well as their fastening elements (134) are obstructed thereby mitigating or eliminating susceptibility to theft.

As shown, a striker system, including a striker and a corresponding latch is provided to hold and secure the tailgate (120) in a raised position. The striker system is comprised of a striker and a corresponding latch. A striker is positioned in communication with and attached to the vehicle (102), also referred to as the vehicle body. As shown herein, there are two strikers, including a first striker ($\mathbf{136}_A$) positioned adjacent to the proximal end (122) of the tailgate (120) and a second striker ($\mathbf{136}_B$) positioned adjacent to the distal end (124) of the tailgate (120). Each of the first and second strikers ($\mathbf{136}_A$) and ($\mathbf{136}_B$), respectively, is sized and configured to receive an adjacently positioned tailgate latch. The tailgate (120) is shown with a first tailgate latch ($\mathbf{126}_A$) and a second tailgate latch ($\mathbf{126}_B$). When the tailgate (120) is in a raised position, the first striker ($\mathbf{136}_A$) receives the first tailgate latch ($\mathbf{126}_A$), and the second striker ($\mathbf{136}_B$) receives the second tailgate latch ($\mathbf{126}_B$). Accordingly, the striker system is comprised of one or more sets of striker-latch combinations configured to hold the tailgate (120) in a raised position, and thereby mitigate access to the cargo area (110).

The tailgate (120) is shown herein with an interior wall ($\mathbf{128}_A$), also referred to herein as a first wall, and an oppositely positioned exterior wall ($\mathbf{128}_B$), also referred to herein as a second wall. The interior wall ($\mathbf{128}_A$) is positioned adjacent to the cargo area, with the exterior wall ($\mathbf{128}_B$) being distally positioned. The interior wall ($\mathbf{128}_A$) is further shown herein with an access panel (140). One or more fastening elements (142), e.g. screws, function to removably secure the access panel (140) to the tailgate (120). In the example shown herein, two fastening elements (142) are shown, although the quantity should not be considered limiting. The access panel (140) may be removed from the interior wall ($\mathbf{128}_A$) of the tailgate (120) by removing the fastening elements (142).

A top wall (150) of the tailgate (120) is configured with an opening (152) configured to house a ladder or stairs (154), hereinafter referred to as the ladder. In an exemplary embodiment, the ladder (154) is retractable and configured to be stored in the opening (152) when not needed or not in use. At such time as the ladder (154) is in a stored position in the tailgate, the tailgate opening (152) receives the ladder (154) and a cover (160) separates the ladder, e.g. ladder step, from an internal region of the tailgate. However, and as shown herein, when the ladder (154) is in an extended or deployed position, the cover (160) and camera fasteners (162) are exposed and accessible. This exposure provides or enables unwarranted or uninvited access to the tailgate (120).

Figure 2:
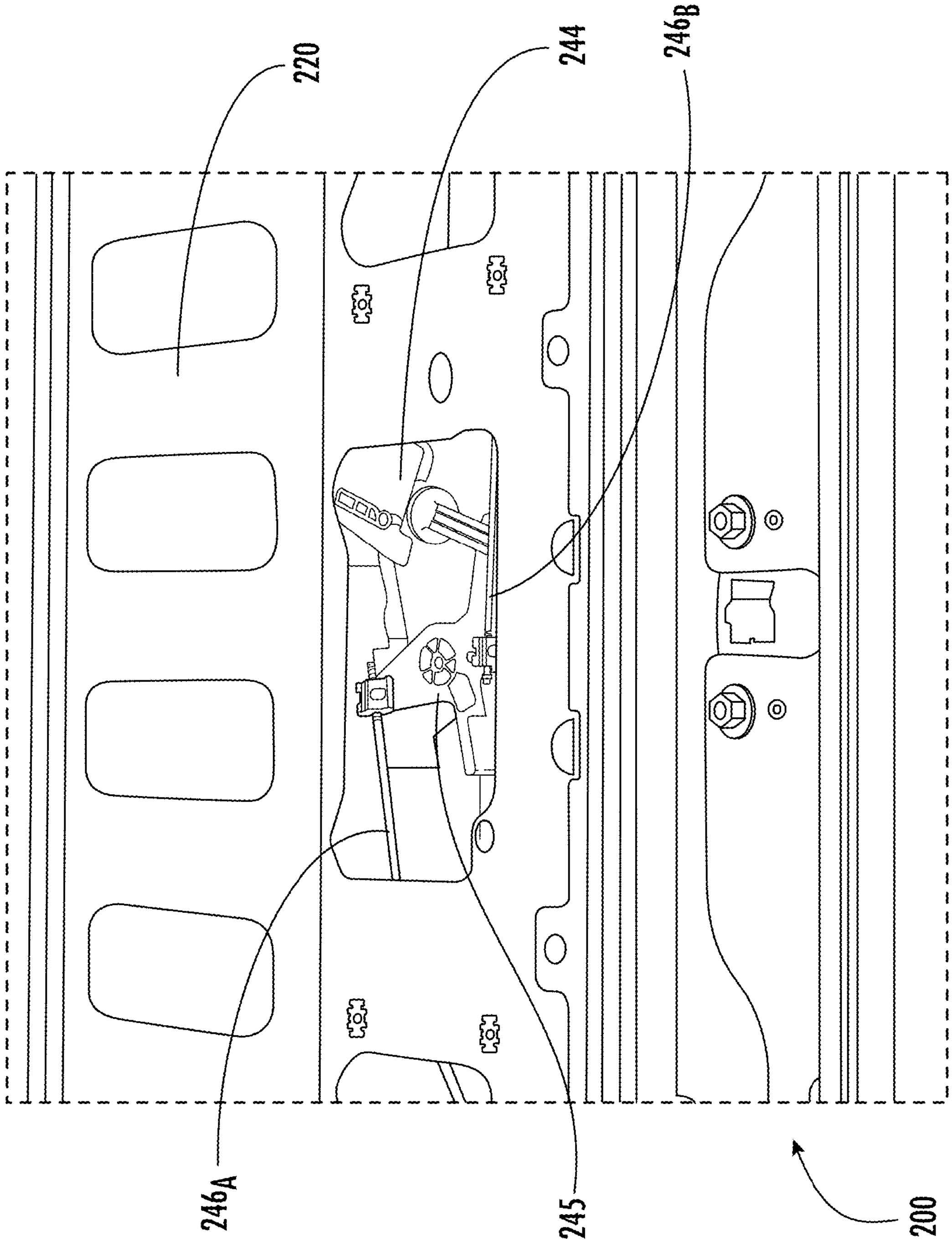
FIG. 2 (PRIOR ART)
FIG. 2 depicts a prior art illustration of an interior of the tailgate of the land vehicle shown in FIG. 1 with a tailgate access panel removed.

Referring to FIG. 2, a prior art illustration (200) of the interior of the tailgate of the land vehicle shown in FIG. 1 is provided with a tailgate access panel removed. As shown, FIG. 2 is labeled with the same label numbers of the apparatus (100) shown in FIG. 1 with the parts and sections shown in the 200 series. Removal of the access panel (140) exposes a tailgate lock actuator motor (244), hereafter referred to as a lock motor, and a tailgate lock rotational link (245), and hereinafter referred to as a lock link. The lock motor (244) and lock link (245) are referred to in combination as a tailgate lock actuator. The lock link (245) is connected to or in communication with the first latch ($\mathbf{126}_A$) and the second latch ($\mathbf{126}_B$) via corresponding first and second tension rods ($\mathbf{246}_A$) and ($\mathbf{246}_B$), respectively. The lock motor (244) and connected lock link (245) together operate or become operational due to an authorized opening event of the tailgate (220). For example, an authorized entrant may engage a tailgate button or coded remote keyless entry system. When engaged, the lock motor (244) linearly extends a rod (not shown) that rotates the lock link (245) in a first direction, e.g. clockwise, and applies a force, e.g. tensile force, to the first and second tension rods ($\mathbf{246}_A$) and ($\mathbf{246}_B$), respectively. This application of force effectively removes the first latch ($\mathbf{126}_A$) from the first striker ($\mathbf{136}_A$) and the second latch ($\mathbf{126}_B$) from the second striker ($\mathbf{136}_B$) and opens the tailgate (220). Once the latches are disengaged from the corresponding strikers, the tailgate can be opened and expose the cargo area of the vehicle. Unauthorized entrants may make use of security vulnerabilities associated with the tailgate lock actuator to open the tailgate and expose the cargo area to unwarranted access. Accordingly, there is a need for an apparatus and method to mitigate or eliminate the security lapse associated with the vehicle tailgate.

Figure 3:
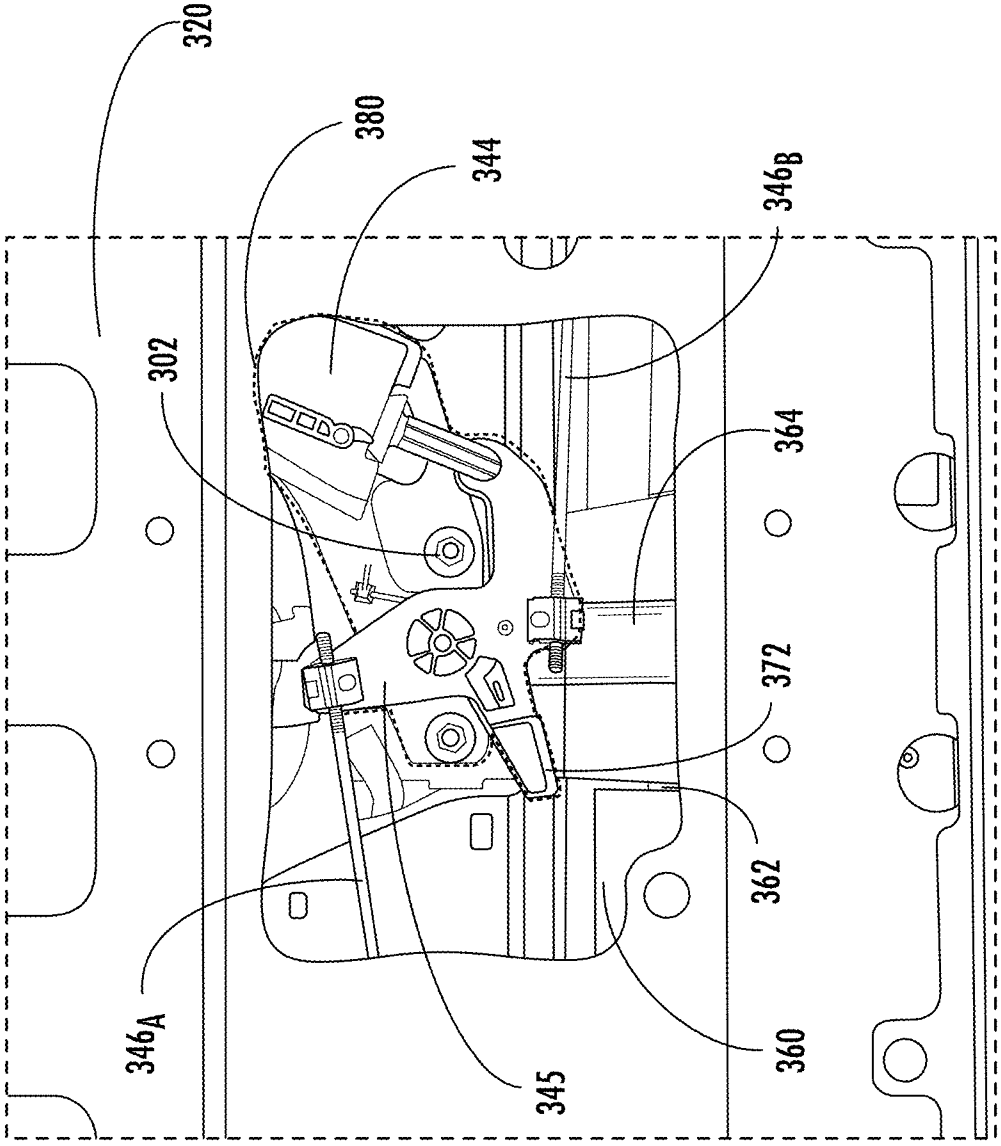
FIG. 3 (PRIOR ART)
FIG. 3 depicts a prior art illustration of internal elements of a tailgate of the land vehicle shown in FIG. 2 with an enlarged view of the actuator assembly after removal of the tailgate access panel.

Referring to FIG. 3, a prior art illustration (300) of internal elements of the tailgate of the land vehicle shown in FIG. 2 is provided with an enlarged view of the actuator assembly after removal of the tailgate access panel. As shown, FIG. 3 is labeled with the same label numbers of the apparatus (100) shown in FIG. 1 with the parts and sections shown in the 300 series. As shown and described in FIG. 2, the lock actuator is comprised of a lock motor (344) and lock link (345), and as shown herein is attached to a bent stiffener (364) via one or more secondary fasteners (302). In an embodiment, the fasteners (302) are separately threaded onto studs (not shown) that align and secure the tailgate lock actuator (380). The cover (360), e.g. tailgate rain cover, as described in FIG. 1 facilitates or otherwise provides access to an opening within the tailgate (320) that stores the ladder, e.g. internal stairs, (350). The cover (360) is shown herein with an opening (362) as provided by the OEM. In an embodiment, the opening (362) functions to facilitate or enable water drainage. The opening (362) is shown herein aligned with a protuberance (372) in communication with the actuator (344). When subject to a force, e.g. such as a push, the protuberance (372) subjects the lock link (345) to a rotation, which applies a force to the first and second tension rods ($\mathbf{346}_A$) and ($\mathbf{346}_B$), respectively. This application of force to the tension rods effectively removes the first latch ($\mathbf{326}_A$) from the first striker ($\mathbf{336}_A$) and the second latch ($\mathbf{326}_B$) from the second striker ($\mathbf{336}_B$), and opens the tailgate (320). Accordingly, the engineering of the tailgate cover (360) creates a security risk with respect unwarranted and uninvited access to elements of the land vehicle.

Figure 4:
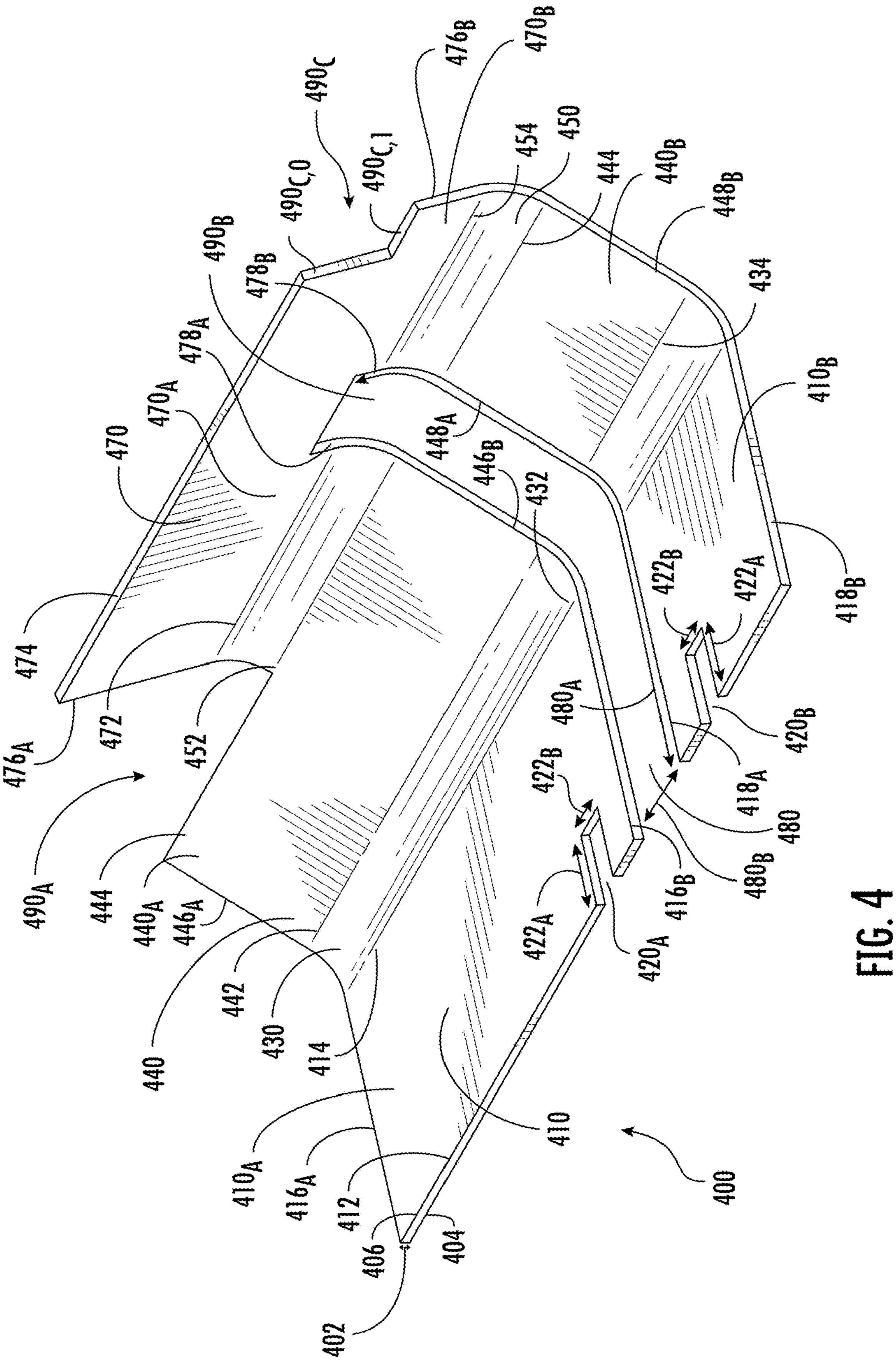
FIG. 4 depicts a perspective view of a theft mitigation apparatus to mitigate or otherwise prevent unwarranted access to the land vehicle tailgate, and thereby mitigate theft of a vehicle accessory or part.

Referring to FIG. 4, a perspective view of a theft mitigation tool is provided to depict an embodiment of a theft mitigation tool (400) to mitigate or otherwise prevent unwarranted access to the land vehicle tailgate, and thereby mitigate theft of a vehicle accessory or part. In an embodiment, the theft mitigation tool is also referred to herein as an apparatus or a tool. As shown, the tool (400) is a unitary apparatus that for descriptive purposes is shown and described herein as comprised of three sections, including a first section (410), a second section (440), and a third section (470). The first section (410) is shown divided into two sub-sections, including a primary sub-section ($\mathbf{410}_A$) and a secondary sub-section ($\mathbf{410}_B$). Both the primary and secondary sub-sections ($\mathbf{410}_A$) and ($\mathbf{410}_B$), respectively, are shown with a first end (412), also referred to herein as a first section proximal end, and a distally positioned second end (414), also referred to herein as a first section distal end. The primary sub-section ($\mathbf{410}_A$) is further shown with a first wall ($\mathbf{416}_A$) extending from the proximal end (412) to the distal end (414), and an oppositely positioned second wall ($\mathbf{416}_B$) extending from the proximal end (412) to the distal end (414). Similarly, the secondary sub-section ($\mathbf{410}_B$) is further shown with a first wall ($\mathbf{418}_A$) extending from the proximal end (412) to the distal end (414), and an oppositely positioned second wall ($\mathbf{418}_B$) extending from the proximal end (412) to the distal end (414). A primary aperture (480) is shown positioned between and separating the primary and secondary sub-sections ($\mathbf{410}_A$) and ($\mathbf{410}_B$), respectively.

The second section (440) is shown with a first end (442), also referred to herein as a second section proximal end, and a distally positioned second end (444), also referred to herein as a second section distal end. The second section (440) is shown divided into two sub-sections, including a primary sub-section ($\mathbf{440}_A$) and a secondary sub-section ($\mathbf{440}_B$). Both the primary and secondary sub-sections ($\mathbf{440}_A$) and ($\mathbf{440}_B$), respectively, are shown with the first end (442) and the distally positioned second end (444). The primary sub-section ($\mathbf{440}_A$) is further shown with a first wall ($\mathbf{446}_A$) extending from the proximal end (442) to the distal end (444), and an oppositely positioned second wall ($\mathbf{446}_B$) extending from the proximal end (442) to the distal end (444). Similarly, the secondary sub-section ($\mathbf{440}_B$) is further shown with a first wall ($\mathbf{448}_A$) extending from the proximal end (442) to the distal end (444), and an oppositely positioned second wall ($\mathbf{448}_B$) extending from the proximal end (442) to the distal end (444). In an embodiment, a measurement, a measure or dimension of the distance from the first wall ($\mathbf{416}_A$) to the second wall ($\mathbf{416}_B$) in primary sub-section ($\mathbf{410}_A$) is the same as or relatively similar to the measure or dimension of the distance from the first wall ($\mathbf{446}_A$) to the second wall ($\mathbf{446}_B$) in the primary sub-section ($\mathbf{440}_A$). In an exemplary embodiment, the distance from the first wall ($\mathbf{416}_A$) to the second wall ($\mathbf{416}_B$) and the distance from the first wall ($\mathbf{446}_A$) to the second wall ($\mathbf{446}_B$) in the primary sub-section ($\mathbf{440}_A$) are each about 6.44 inches, although this measurement should not be considered limiting. In an embodiment, this measurement may range from about 6.00 inches to about 6.50 inches. Similarly, in an embodiment, a measurement, a measure, or dimension of the distance from the first wall ($\mathbf{418}_A$) to the second wall ($\mathbf{418}_B$) in secondary sub-section ($\mathbf{410}_B$) is the same as or relatively similar to the measure or dimension of the distance from the first wall ($448_A$) to the second wall ($448_B$) in the secondary sub-section ($440_B$). In an exemplary embodiment, the distance from the first wall ($418_A$) to the second wall ($418_B$) in secondary sub-section ($410_B$) and the distance from the first wall ($448_A$) to the second wall ($448_B$) in the secondary sub-section ($440_B$) are each about 2.81 inches, although this measurement should not be considered limiting. In an embodiment, this measurement may range from about 2.50 inches to about 3.00 inches. The primary aperture (480) is shown positioned between and separating the primary and secondary sub-sections ($440_A$) and ($440_B$), respectively.

The third section (470) is shown with a first end (472), also referred to herein as a third section proximal end, and a distally positioned second end (474), also referred to herein as a third section distal end. The third section (470) is shown with a first wall ($476_A$) and an oppositely positioned second wall ($476_B$). A first notch ($490_A$) is shown positioned in the third section (470) adjacent to the proximal end (472), the second section distal end (444), and the third section first wall ($476_A$). In an embodiment, the second section distal end (444) and the third section first wall ($476_A$) form the walls of the first notch ($490_A$). As further shown, the primary aperture (480) extends into the third section (470) and is shown positioned between and separating a portion of the third section (470) into primary and secondary sub-sections ($470_A$) and ($470_B$), respectively. The first sub-section ($470_A$) extends from the first wall ($476_A$) to notch wall ($478_A$), and the second sub-section ($470_B$) extends from notch wall ($478_B$) to the second wall ($476_B$).

A first transition section (430) is shown positioned between the first and second sections (410) and (440), respectively. The first transition section (430) is shown with a first end (432) positioned adjacent to the first section distal end (414), and a distally positioned second end (434) positioned adjacent to the second section proximal end (442). A second transition section (450) is shown positioned between the second and third sections (440) and (470), respectively. The second transition section (450) is shown with a first end (452) positioned adjacent to the second section distal end (444), and a distally positioned second end (454) positioned adjacent to the third section proximal end (472). As shown herein the second transition section (450) is separated by the primary aperture (480).

Figure 5:
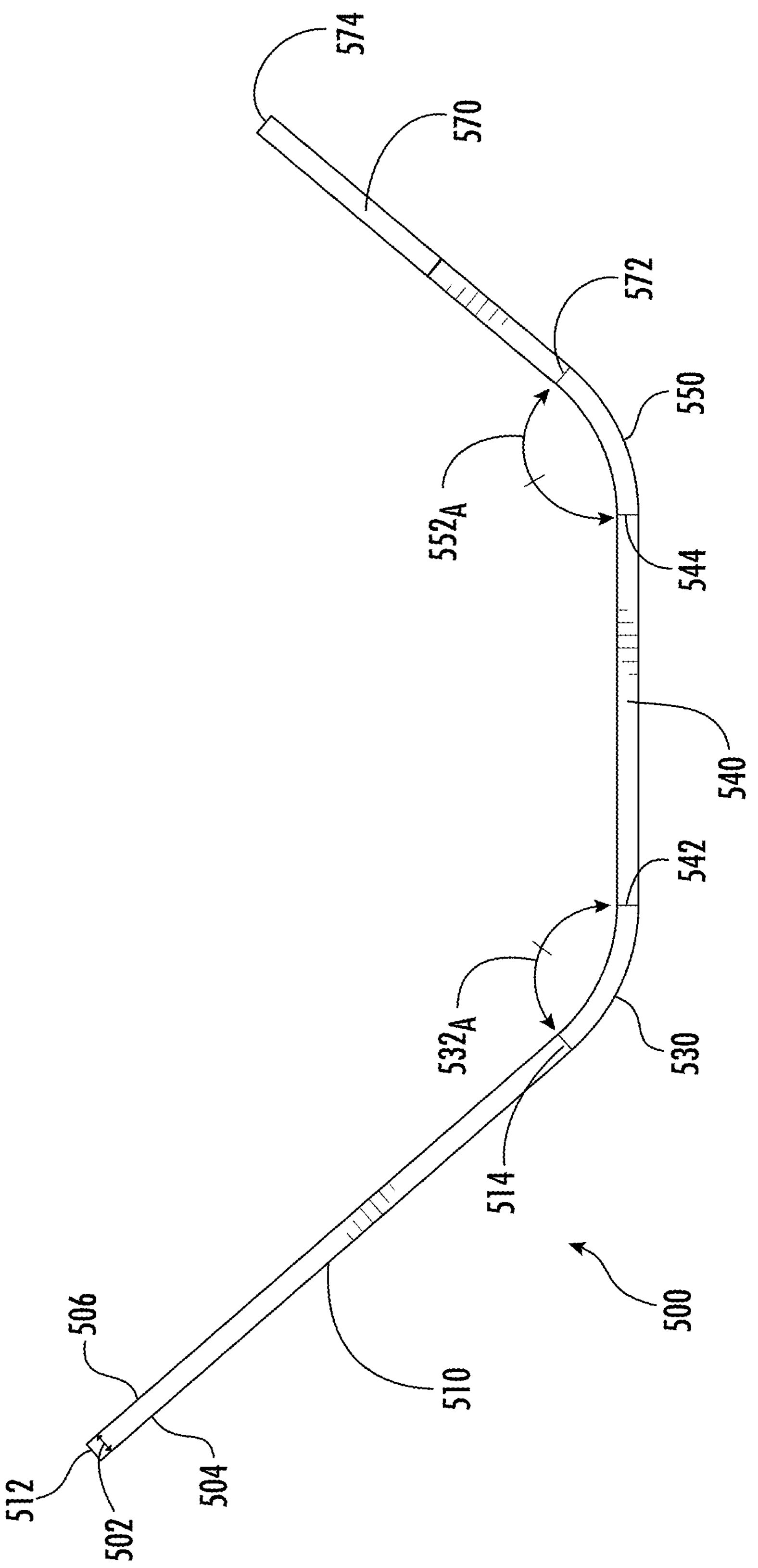
FIG. 5 depicts a side view of the theft mitigation apparatus shown in FIG. 4.

Referring to FIG. 5, a side view (500) of the theft mitigation tool is provided. As shown, FIG. 5 is labeled with the same label numbers of the apparatus (400) shown in FIG. 4 with the parts and sections shown in the 500 series. The first section (510) is planar or relatively planar from the first end (512) to the distally positioned second end (514). The first section (510) is shown having a first depth (502) extending from a first wall (504) to a second wall (506). The first depth (502) is shown in FIG. 4 and labeled as (402) extending from a first wall (404) to a second wall (406). The first depth (402)/(502) is relatively or substantially uniform across the apparatus (400)/(500) from the first section (410), first transition section (430), second section (440), second transition section (450), and third section (470). In an exemplary embodiment, the first depth (402)/(502) is about 0.0598 inches or 16-gauge, although this measurement should not be considered limiting. In an embodiment, this measurement (402)/(502) may range from about-0.01 inches to about 0.1 inches. Similarly, the second section (540) is planar or relatively planar from the first end (542) to the distally positioned second end (544), and the third section (570) is planar or relatively planar from the first end (572) to the distally positioned second end (574). As shown herein, the first transition section (530) is angularly positioned between the first and second sections (510) and (540), respectively. In an embodiment, the first transition section (530) creates a first obtuse angle ($532_A$) between the first section (510) and the second section (540). In an exemplary embodiment, the first obtuse angle ($532_A$) is about 125 degrees, although this measure should not be considered limiting. In an embodiment, the first obtuse angle measurement ($532_A$) may range from about 115 degrees to about 135 degrees. Similarly, the second transition section (550) is angularly positioned between the second and third sections (540) and (570), respectively. In an embodiment, the second transition section (550) creates a second obtuse angle ($552_A$) between the second section (540) and the third section (570). In an exemplary embodiment, the second obtuse angle ($552_A$) is about 130 degrees, although this measure should not be considered limiting. In an embodiment, the second obtuse angle ($552_A$) may range from about 120 degrees to about 140 degrees.

The primary aperture (480) extends through the first section (410), the first transition section (430), the second section (440), the second transition section (450), and partially into the third section (470), with the partial extension forming a second notch ($490_B$). The primary aperture (480) is shown configured with a first dimension ($480_A$), e.g. length, and a second dimension ($480_B$), e.g. width. In an embodiment, the second dimension is uniform across the first dimension, and the first dimension is uniform across the second dimension. In an exemplary embodiment, embodiment, the measurement of first dimension ($480_A$) is about 3.9 inches, although this measurement should not be considered limiting. In an embodiment, the measurement of the first dimension ($480_A$) may range from about 3.5 inches to about 4.25 inches. Similarly, in an exemplary embodiment, the measurement of the second dimension ($480_B$) is about 1.28 inches, although this measurement should not be considered limiting. In an embodiment, the measurement of the second dimension ($480_B$) may range from about 1.15 inches to about 1.40 inches.

The first section (410) is further configured with a plurality of secondary apertures, shown herein as ($420_A$) and ($420_B$). Although two secondary apertures are shown, the quantity should not be considered limiting. In an exemplary embodiment, the secondary apertures ($420_A$) and ($420_B$) each have a first dimension ($422_A$), e.g. length, and a second dimension ($422_B$), e.g. width. In an embodiment the first and second dimensions ($422_A$) and ($422_B$), respectively, in each of the secondary apertures ($420_A$) and ($420_B$) are substantially identical. In an exemplary embodiment, the measurement of first dimension ($422_A$) is about 0.49 inches, although this measure should not be considered limiting. In an embodiment, the measurement of first dimension ($422_A$) may range from about 0.45 inches to about 0.55 inches. Similarly, in an exemplary embodiment, the measurement of the second dimension ($422_B$) is about 0.46 inches, although this measure should not be considered limiting. In an embodiment, the measurement of second dimension ($422_B$) may range from about 0.40 inches to about 0.52 inches. The secondary apertures ($420_A$) and ($420_B$) are configured to be received by secondary elements, which in an embodiment are the threaded studs (not shown) to which the tailgate lock actuator is attached.

The third section (470) is shown with three notches, including a first notch ($490_A$), a second notch ($490_B$), and a third notch ($490_C$). The first notch ($490_A$) is positioned adjacent to the second section distal end (444) and the first wall ($476_A$). The second notch ($490_B$) is formed as an extension or a part of the primary aperture (480), and the third notch ($490_C$) is positioned adjacent to the second end (474) and is shown with third notch walls ($490_{C,0}$) and ($490_{C,1}$). In an embodiment, third notch wall ($490_{C,0}$) is substantially parallel to the third section (470) first wall ($476_A$), and third notch wall ($490_{C,1}$) is substantially parallel to the second section distal end (444) and orthogonal to third notch wall ($490_{C,0}$).

Figure 6:
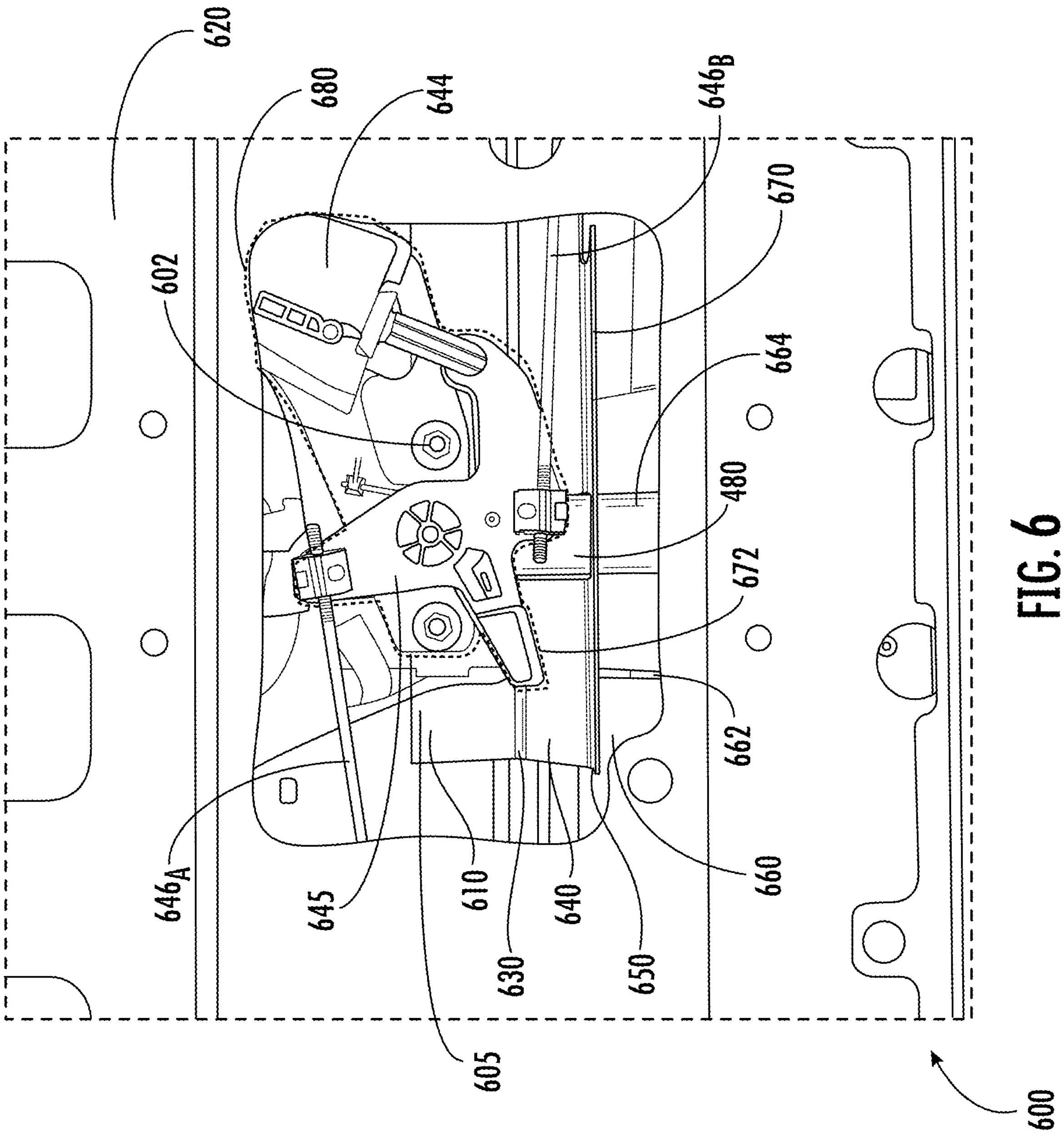
FIG. 6 depicts a perspective view of the theft mitigation apparatus shown installed within the tailgate of the land vehicle.

The apparatus shown and described herein is configured to be installed within the tailgate of the land vehicle. Referring to FIG. 6, a perspective view (600) of the apparatus is shown installed within the tailgate of the land vehicle is provided. As shown, the apparatus (605) is positioned relative to the lock link (645) with the first section (610) shown beneath the lock link and above the bent stiffener (664), the second section (640) positioned proximal to the actuator, and the third section (670) is shown extending away from the stiffening rib. The first and third sections (610) and (670), respectively, are positioned relative to the second section (640). The first and second transition sections (630) and (650), respectively, are shown with their concave curvature, e.g. obtuse angles, to clear internal components of the tailgate. In an embodiment, the obtuse angles of the transition sections (630) and (650) enables the apparatus (605) to mitigate or prevent interference with one or more functional components of the tailgate apparatus. The apparatus (605) is shown positioned between the actuator (680), which is comprised of the lock motor (644) and the lock link (645), and the cover (660). In an embodiment, the apparatus is secured with one or more fasteners (602) configured to be received by the secondary apertures (420A and $420_B$). Once secured, the apparatus (605) blocks or otherwise prevents access to the proturbence (372/672) from the opening (362/662). The primary aperture (480) is shown positioned to receive a stiffening rib (664).

When positioned relative to the tailgate (120), the tool mitigates or eliminates unwarranted or uninvited access to the cargo area (110) by mitigating or eliminating unauthorized opening and closing of the tailgate (120). Mitigating unwarranted or uninvited access to the cargo area (110) also prevents access to the tail light fastening elements (134), thus mitigating potential theft of the tail lights ($132_A$) and ($132_B$). The embodiments shown and described herein are directed at the apparatus shown and described in FIGS. 4 and 5 configured to be positioned within the tailgate (120) and relative to the actuator.

Figure 7:
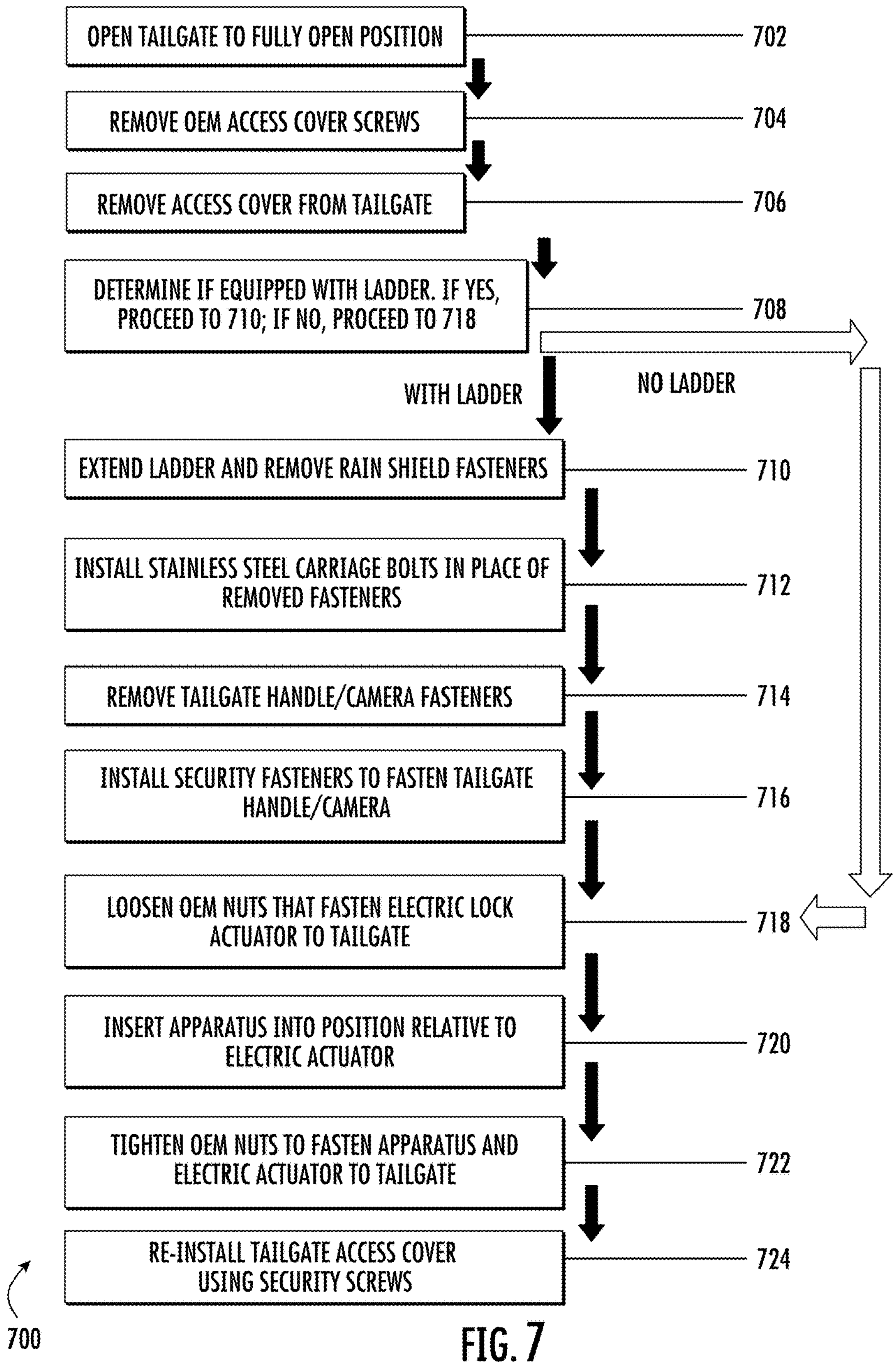
FIG. 7 depicts a flow chart to illustrate a method for installation of the theft mitigation tool relative to the land vehicle.

Referring to FIG. 7, a flow chart (700) is provided to illustrate a method for installation of the theft mitigation tool relative to the land vehicle. The tailgate is positioned in an open or lowered position (702). As shown in FIG. 1, one or more fasteners, referred to herein as OEM fasteners, secure a tailgate cover to an inside wall of the tailgate. Following step (702), the OEM fasteners are removed (704), followed by removal of the access cover from the tailgate (706). It is understood that in an embodiment, the tailgate may be configured with a ladder, such as the ladder or stairs (154), shown in FIG. 1. Similarly, in an embodiment, the tailgate may be configured without the ladder (154). Following step (706) and if the tailgate is equipped with the ladder (708), the steps of the ladder are extended and fasteners associated with a corresponding rain shield are removed (710). Thereafter, the fasteners at step (710) are replaced with one or more alternative fasteners (712). In an embodiment, the replacement fasteners are comprised of a stainless steel material. Following step (712), the fasteners that secure the tailgate handle and an associated tailgate camera are removed (714), and replaced with one or more alternative security fasteners to secure the tailgate handle and camera (716). If the tailgate is not equipped with the ladder, steps (710) through step (716) are skipped. For all ladder configurations, one or more fasteners that secure the tailgate actuator to the tailgate are loosened (718). In an embodiment, the loosening of the fasteners associated with the actuator enables the actuator to remain connected to the tailgate. The security apparatus shown and described in FIGS. 4 and 5 is then inserted into position relative to the actuator (720). In an exemplary embodiment, the positioning of the apparatus at step (720) includes releasably engaging the secondary elements, e.g. the studs to which the actuator is attached. In an embodiment, the security apparatus is positioned beneath the actuator at step (720). Once the security apparatus is positioned relative to the actuator, the one or more fasteners that were loosened at step (718) are subject to being fastened to secure the actuator and the apparatus relative to the tailgate (722). After the actuator and apparatus are secured at step (722), the security apparatus installation is complete and the tailgate access cover is re-installed (724), using one or more alternative security fasteners to secure the tailgate access cover. Accordingly, the method shown herein installs the security apparatus relative to the tailgate to enable the actuator to maintain functionality relative to the striker-latch system associated with the tailgate, while mitigating or eliminating uninvited or improper access associated with the tailgate.

In the event the theft mitigation device needs to be removed from the vehicle, steps (702)-(724) may be reversed.

The term tailgate has been used herein to describe a moveable door to close or enclose a cargo area of a land vehicle. The tailgate is shown and described herein as hinged to rotate vertically upward or downward. In an embodiment, the tailgate may be hinged at a side wall of the vehicle enabling the tailgate to rotate laterally with respect to the cargo area of the vehicle. Accordingly, the hinge location of the tailgate should not be considered a limiting factor with respect to the theft mitigation tool and application of the tool with respect to the land vehicle.

The apparatus shown and described herein is comprised of a durable material. In an exemplary embodiment, the durable material is stainless steel, such as 304 stainless steel. Similarly, in an embodiment, the apparatus materials may be any ductile stainless steel, carbon steel, an alloy aluminum, composite, or a number of other materials. Similarly, although shown with multiple sections and transition sections, in an embodiment, the apparatus may be comprised of a unitary material that is subject to laser cut and bending to form the openings, notches, and angles of the transition sections. While particular embodiments of the present embodiments have been shown and described, it will be obvious to those skilled in the art that, based upon the teachings herein, changes and modifications may be made without departing from the embodiments and its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use in the claims of definite articles. As used herein, the term "and/or" means either or both (or one or any combination or all of the terms or expressed referred to).

It will be appreciated that, although specific embodiments have been described herein for purposes of illustration, various modifications may be made without departing from the spirit and scope of the embodiments. In particular, the theft mitigation device supports and enables mitigation of theft by limiting, obscuring, or preventing access to an opening form relative to the cargo area and tailgate of the land vehicle. Accordingly, the scope of protection of the embodiments is limited only by the following claims and their equivalents.

What is claimed is:

1. An apparatus configured to be positioned relative to a vehicle, the apparatus comprising:

a first section, the first section including a primary aperture configured to be received by a secondary element, the primary aperture configured to extend from a first section proximal end to a distally positioned first section distal end; a first transition section, adjacently positioned to the first section, configured to transition from the first section to a second section and having a first angular position relative to the first and second sections; the second section including the primary aperture, the primary aperture configured to extend from a second section proximal end to a distally positioned second section distal end; a second transition section, adjacently positioned to the second section, configured to transition from the second section to a third section and having a second angular position relative to the second and third sections; and the third section configured to extend from a third section proximal end to a distally positioned third section distal end, and the primary aperture configured to extend from the second transition section into the third section.

2. The apparatus of claim 1, further comprising the primary aperture configured to separate the first section into a first section first sub-section and a first section second sub-section, the first section first sub-section and the first section second sub-section each configured to extend from the first section proximal end to the distally positioned first section distal end.

3. The apparatus of claim 2, wherein the first section further comprises a secondary aperture, including a first secondary aperture positioned in the first section first sub-section adjacent to the first section proximal end, and a second secondary aperture positioned in the first section second sub-section adjacent to the first section proximal end.

4. The apparatus of claim 1, further comprising the primary aperture configured to separate the second section into a second section first sub-section and a second section second sub-section, the second section first sub-section and the second section second sub-section each configured to extend from the second section proximal end to the distally positioned second section distal end.

5. The apparatus of claim 1, wherein the first section is substantially planar from the first section proximal end to the distally positioned first section distal end.

6. The apparatus of claim 1, wherein the second section is substantially planar from the second section proximal end to the distally positioned second section distal end.

7. The apparatus of claim 1, wherein the third section is substantially planar from the third section proximal end to the distally positioned third section distal end.

8. The apparatus of claim 1, wherein the first angular position is configured to position the first and second sections at a first obtuse angle.

9. The apparatus of claim 1, wherein the second angular position is configured to position the second and third sections at a second obtuse angle.

10. The apparatus of claim 1, wherein the third section includes a third section first end and a distally positioned third section second end, and the third section first end and the third section second end positioned at an obtuse angle relative to the second section distal end.

11. The apparatus of claim 10, further comprising a first notch and a second notch positioned relative to the third section.

12. The apparatus of claim 11, wherein the first notch further comprises a first notch first wall and a first notch second wall, the first notch first wall positioned orthogonal to the first notch second wall.

13. The apparatus of claim 12, wherein the first notch first wall is positioned substantially adjacent to the second section distal end, and the first notch second wall is positioned substantially adjacent to a second transition section proximal end and the third section proximal end.

14. The apparatus of claim 11, wherein the second notch further comprising a second notch first wall and a second notch second wall, the second notch first wall positioned orthogonal to the second notch second wall.

15. The apparatus of claim 14, wherein the second notch first wall is positioned substantially parallel to the second section distal end, and the second notch second wall is positioned substantially orthogonal to a second transition section distal end and the third section distal end.

16. The apparatus of claim 1, further comprising the first section, the first transition section, the second section, the second transition section, and the third section having a first depth.

17. A method comprising:

providing a multi-section apparatus, the apparatus including a first section, a first transition section adjacently positioned relative to the first section, a second section adjacently positioned relative to the first transition section, a second transition section adjacently positioned relative to the second section, and a third section adjacently positioned relative to the second transition section, a primary aperture extending through the first section, the first transition section, the second section, the second transition section, and into the third section, the primary aperture configured to be received by a secondary element; the first transition section having a first angular position relative to the first and second sections, and the second transition section having a second angular position relative to the second and third sections; and positioning the apparatus relative to the secondary element, including releasably engaging the secondary element.

18. The method of claim 17, wherein the secondary element is a threaded stud configured to position an actuator in a tailgate of a land vehicle.

* * * * *